Figure 1:
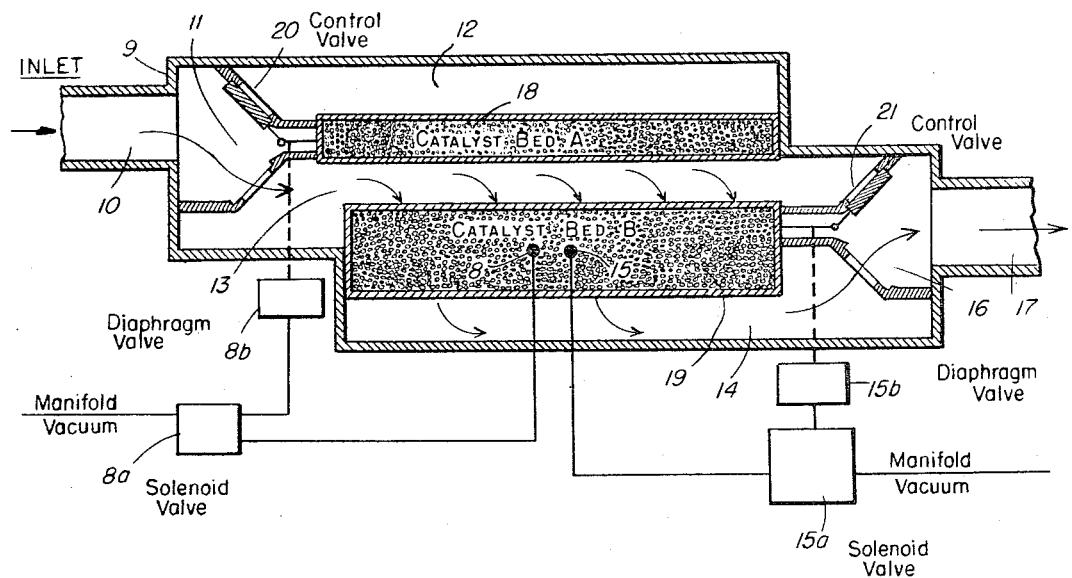

Jan. 10, 1967 S. C. EASTWOOD 3,297,400
CATALYTIC PURIFICATION OF EXHAUST GASES
Filed Sept. 11, 1962

INVENTOR.
Sylvander C. Eastwood
By
Attorney

United States Patent Office 3,297,400
Patented Jan. 10, 1967

3,297,400
CATALYTIC PURIFICATION OF EXHAUST GASES
Sylvander C. Eastwood, Woodbury, N.J., assignor to Mobil Oil Corporation, a corporation of New York
Filed Sept. 11, 1962, Ser. No. 222,782
4 Claims. (Cl. 23—2)

This invention relates to a system for catalytic purification of automobile exhaust gases. In one aspect, the invention is directed to a method for oxidation of exhaust gases while controlling the catalyst bed temperatures to prevent excessively high temperatures. Another aspect of this invention is directed to an automobile catalytic converter for the oxidation of substantially all of the oxidizable gases under controlled temperature conditions.

As is well known, the exhaust gases of internal combustion engines contain considerable quantities of toxic and obnoxious fumes. Such fumes comprise unburned or partially burned hydrocarbons, particularly olefinic hydrocarbons, which react with nitrogen oxides and with oxygen under the influence of sunlight to produce pollutants which have a destructive odor, are irritating to the mucous membranes, particularly of the eyes and cause damage to certain species af plants. Of the toxic gases, carbon monoxide is one of the most deadly. Thus, amounts as small as 0.1 volume percent of carbon monoxide in the atmosphere are dangerous to life and lethal amounts can, without realization, be inhaled and combined with blood hemoglobin before its effects are evident. In areas of congested vehicular traffic where frequent stopping is necessary, the carbon monoxide contained in the exhaust gas of an average automobile ordinarily amounts to 4.5 percent by volume and may, at times, reach 9 percent by volume. Automobile and similar exhaust gases are also objectionable because of their malodorous constituents attributable to unburned fuel and oil and the decomposition products thereof.

It has heretofore been proposed to treat the above obnoxious and dangerous exhaust fumes by passage through a catalytic converter wherein the fumes are brought into contact with an oxidation catalyst and thereby undergo conversion. In such manner, carbon monoxide is converted to carbon dioxide and hydrocarbon constituents of the exhaust gas undergo oxidation to carbon dioxide and water. However, a major difficulty encountered in operation of such catalytic converters has been that over a period of time the non-combustible materials in the exhaust gases, such as lead, build up on the catalyst particles and seriously deactivate the oxidation catalyst. On catalyst deactivation extremely high temperatures are required by the catalysts to conduct the oxidation of the exhaust gases. When high temperature conditions are required to oxidize the exhaust gases, the automobile exhaust gases produced in the initial start-up stage are not up to oxidation temperatures and require a short period of time for heating the gases to the desired oxidation temperatures. If excessive high temperatures are required for oxidation by the oxidation catalyst, the gases will pass through the converter unreacted in the initial start-up stage. In order to decrease the amount of oxidizable materials at start-up, it would be highly desirable to contact these gases with the most active catalyst available to provide at least some oxidation during this period which would not only reduce some of the oxidizable materials in the exhaust gases but if a small amount of oxidation occurs, the external heat produced thereby would accelerate the heating of the surrounding area and the remaining catalyst zones. Utilizing catalytic converters wherein the flow of gases is continuous in the catalyst beds, there is no opportunity for any part of the catalyst bed to be more active than the other parts of the catalyst bed. Furthermore, utilizing a catalytic converter wherein the flow of gases is continuous through all of the catalyst beds, a method for controlling the catalyst temperature is not available. These conditions are conducive for attaining excessively high oxidation temperatures which cannot only seriously damage the oxidation catalyst structure but also seriously damage the catalyst converter itself.

It is the object of this invention to provide a method and catalytic converter for oxidation of the exhaust gases of an internal combustion engine while protecting the oxidation catalyst utilized from excessively high oxidation temperatures. A further object of the invention is to provide a method and catalytic converter wherein the initial automobile exhaust gases at start-up will always contact the most active catalyst zone to provide a more efficient oxidation procedure for the exhaust gases. The above and other objects of the invention which will be apparent to those skilled in the art are achieved by the present method and apparatus hereinafter described in detail and illustrated by the accompanying drawings.

In accordance with this invention, there is provided a catalytic converter for oxidizing toxic gases and obnoxious constituents of internal combustion engine exhaust gases which controls the flow of said gases through said converter to avoid excessive catalyst bed temperatures and provide contact of the initial start-up exhaust gas which are at low temperatures with the most active portion of the oxidation catalysts available in the catalytic converter. The catalytic converter of this invention comprises a housing of any suitable shape having inlet means for the admission of the exhaust gases of an internal combustion engine and an added source of air necessary to obtain substantially complete oxidation of said exhaust gases. The added air can be supplied by any suitable means, such as an air pump, an attached venturi tube to the inlet means, and the like. The mixture of exhaust gas and air enters the catalytic converter through an inlet conduit which pierces the wall of the housing affording admission of the gas mixture to a series of confined spaces or conduits capable of diverting the gas flow from one path to another through various zones containing oxidation catalyst. Within the housing, there are positioned a plurality of separately confined zones, arranged in sequential fashion and adapted to contain beds comprising oxidation catalyst, so as to provide conduits or free spaces overlying and underlying the beds of catalyst for the flow of gases therethrough. The temperature-sensitive means can control a valve located in the inlet conduit which can direct the flow of gases through all of the beds, through one of the beds, or can serve to pass the gases through the catalytic converter but by-pass the beds entirely. A temperature sensitive means can control a valve in the outlet conduit, which serves to control the flow of gases within the catalyst converter in such a manner so as to permit the gases to flow through all of the beds and through at least one of the beds, or permit the gas to flow through the catalytic converter directly to the atmosphere.

If the sensible heat of the exhaust gas stream is depended upon to raise the catalyst to activation temperature, it has been found that under ordinary conditions of engine operation an excessively long time is required, i.e., usually from 5 to 15 minutes or longer, during which period the catalyst is not serving its intended function of bringing about oxidation of the toxic and obnoxious components of the exhaust gas. During this initial operation, substantial quantities of unburned hydrocarbons are present in the exhaust gases and deposit on the catalyst beds. Since the catalytic converter of the present invention has a plurality of catalyst beds, arranged in series, the initial catalyst bed will tend to contact the greater portion of the unburned hydrocarbons. At these low temperatures, the temperature-sensitive means in the inlet tube can direct the flow of all of the gases through all of the available catalyst beds. It is desirable, therefore, to maintain the initial beds at the highest catalyst activity possible so that at low temperature operation the exhaust gases will contact the catalyst having highest activity. At low temperatures, the temperature-sensitive means in the inlet tube can direct the flow of all of the gases through all of the available catalyst beds. When the oxidation process is initiated, the heat produced by the exothermic catalytic oxidation of the combustible components in the exhaust gas is sufficient to raise the catalyst temperature in the last bed above its activation temperature and to effectively oxidize the unburned components. At this point, the temperature-sensitive means in the inlet means will divert the flow of the mixture of exhaust gases and air directly to the ultimate catalyst bed by-passing the initial catalyst bed. Since the flow of gases is then diverted away from the initial beds, the limited use of these beds will maintain the highest activity level for further use at low temperatures and significantly extend the life of these catalysts. However, the problem then becomes one of controlling the temperature of the catalyst, under the varying driving speeds, below that at which activity of the catalyst is adversely thermally effected or even destroyed. For instance, at speeds above about 60 miles per hour, the inlet temperature to the catalytic converter can become excessive. A high converter inlet temperature, i.e. above about 1000° F. will result in catalyst bed temperatures of 1300° F. and higher which can seriously damage and inactivate the catalyst bed if maintained over extended periods of time. At these excessive temperatures, and at excessive bed temperatures, the temperature-sensitive means in the ultimate catalyst bed can control the valve in outlet conduit to permit the exhaust gases to flow through the catalytic converter directly to the atmosphere by-passing and protecting the catalysts within the catalytic converter. The use of temperature-sensitive valve means in the inlet and outlet conduits of the catalytic converter not only control the flow of the exhaust gases but also can effectively control the catalyst bed temperatures and protect the catalysts within the catalytic converter.

The temperature-sensitive valve means in the outlet and inlet conduits employed for swtiching the exhaust gas flow from one conduit to the other in accordance with present invention may be any feasible valve such as a simple thermostatic type valve commonly used on automobile engine manifold systems. Thus, the switching of gas flow may be effectively accomplished by equipping the inlet and outlet conduit with simple flapper valves operated from a bimetallic control device. Alternately, a pneumatic or electrically operated valve, while more expensive, may be effectively employed. To control temperatures, the control point for the temperature-sensitive means is ideally located in the ultimate catalyst bed.

Any suitable oxidation catalyst capable of operating over relatively long periods at temperatures of from about 600° F. to 1600° F. may be employed in the catalytic converter. Although, the invention is not limited to any particular catalyst, a preferred catalyst comprises small particles, such as spheres, extrudates, pellets, etc. of about $\frac{1}{32}''$ to $\frac{1}{4}''$ in size of a porous support such as for example, alumina, having deposited thereon or admixed therewith a metal or metal oxide or mixtures thereof having oxidation activity such as for example, platinum, palladium, copper oxide, copper chromite or other mixtures of chromium and copper oxides and the like.

Figure 2:
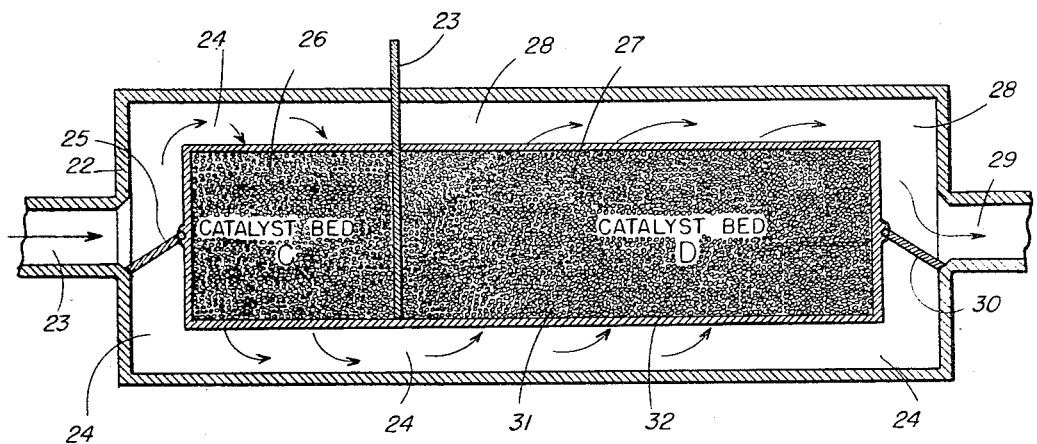

The invention may be more readily understood from a consideration of the attached drawings wherein FIGURE 1 and FIGURE 2 depict preferred embodiments, in schematic form, of the catalytic converter of this invention.

Referring more particularly to FIGURE 1, exhaust gas from an internal combustion engine with added air, passes into the catalyst converter housing 9 through inlet conduit 10 into conduit 11. The temperature-sensitive valve means or control valve 20, with the control point 8, in catalyst bed 19, in the closed position to conduit 13, can direct at predetermined temperatures below some given point in the 800 to 1200° F. range, preferably 900° F., the exhaust gas through conduit 11 into conduit 12 through catalyst bed A18 to conduit 13. The control point 8 can be utilized at a predetermined temperature by means of a thermoswitch which actuates a solenoid valve 8a cutting off vacuum from the engine manifold, as designated, going to the diaphragm valve 8b. The actuation of the various valves by the control point can be conducted under conditions to open or close the control valve 20, as desired. The temperature-sensitive valve means or control valve 20, in the closed position to conduit 12, at catalyst bed temperatures of catalyst bed 18 greater than the predetermined temperature than some given point in the 800 to 1200° F. range, preferably 900° F., will direct the flow of gas into conduit 13 through catalyst bed B19 into conduit 14 into conduit 16 and through the outlet means 17 to the atmosphere. The temperature-sensitive valve means 21, with its control point 15 in catalyst bed B19, is in the closed position to conduit 13, as shown to permit the flow of gases through catalyst bed B19 at temperatures below which the catalyst will not be permanently damaged; these temperatures can be in the 1200 to 1600° F. range, for example below about 1300° F. The control point 15 can be utilized at a predetermined temperature by means of a thermoswitch which actuates a solenoid valve 15a cutting off vacuum from the engine manifold, as designated, going to the diaphragm valve 15b. The actuation of the various valves by the control point can be conducted under conditions to open or close the control valve 21, as desired. When the temperature of catalyst bed B19 becomes excessive above that at which the catalyst can be permanently damaged, the temperature-sensitive valve means 21 opens to permit the exhaust gases to pass from conduit 13 directly to the atmosphere by-passing all the catalyst beds and passing through conduit 16 and outlet means 17 to the atmosphere.

FIGURE 2 represents another form of a preferred embodiment of the catalytic converter of this invention. In FIGURE 2, the available catalyst beds within the catalytic converter housing 22 are on the same plane separated by a barrier 23. The exhaust gas from the internal combustion engine, with added air, passes into the converter through inlet conduit 23 into conduit 24. The temperature-sensitive valve means 25, with the control point (not shown) in catalyst bed D27, in the closed position to the lower conduit 24, can direct the gases through the upper passageway 24, as shown, into and through catalyst bed C26 into the lower conduit 24 when the predetermined temperature of catalyst bed C26 is below some given point in the 800 to 1200° F. range, preferably 900° F. The temperature-sensitive valve means 25 in the closed position to upper conduit 24 at bed temperatures of catalyst bed 26 greater than the predetermined temperatures than some given point in the 800 to 1200° F. range, preferably 900° F., will direct the flow of gas into the lower conduit 24, by-passing catalyst bed C26, through catalyst bed D27, into conduit 28 and through the outlet conduit 29 to the atmosphere. The temperature-sensitive valve means 30, with its control point, not shown, in catalyst bed D27, is in the closed position to lower passageway 24, as shown, to permit the flow of gases through catalyst bed D27 at temperatures below which the catalyst will not be permanently damaged; these temperatures can be in the range from about 1200 to 1600° F., preferably below 1300° F. When the temperature of catalyst bed D27 becomes excessive above that at which the catalyst can be permanently damaged, the temperature-sensitive valve means 30 then closes off conduit 28 and opens conduit 24 to permit the exhaust gases to pass directly through the catalytic converter to the atmosphere, by-passing all the catalyst beds. The control systems utilized to operate valves 25 and 30 can be similar to the systems used in FIGURE 1.

Numerous advantages in the use of the process and apparatus of this invention are readily apparent to those skilled in the art. The principal advantage, however, relates to a safety feature of this invention. It is to be noted that in this process, the exhaust gases to be oxidized are always passed into the catalytic converter. At excessively high catalyst bed temperatures, the temperature-sensitive valve means in the outlet and inlet portions permits the gases to flow directly to the atmosphere thereby protecting the oxidation catalyst utilized from serious deactivation or total destruction and/or permanently damaging the catalytic converter itself. With this safety feature built into this process, additional safety equipment such as a by-pass valve prior to the inlet means, a bulky tube by-passing the catalytic converter, and the like, is unnecessary if excessively high temperatures are attained. If a by-pass valve is needed prior to the inlet means, the flow of the excessive hot gases may not be controlled and directed to the underside of the automobile or which may seriously damage the surrounding area and/or permit leakage of this gas into automobile itself. If additional tubes are placed in such a position so as to by-pass the converter at excessive high temperatures, additional bulk and weight is added to the catalytic converter which is highly undesirable. The catalytic converter of this invention is not bulky, easy to attach to automobile exhaust lines, and permits the flow of all the gases safely to the atmosphere free of the interior of the automobile.

It is to be understood that the above description is merely illustrative of preferred embodiments of the invention of which many variations may be made within the scope of the following claims by those skilled in the art without departing from the spirit thereof.

What is claimed is:

1. A method for controlling catalyst bed temperatures in the oxidation of exhaust gases of an internal combustion engine which comprises flowing a gaseous mixture of said exhaust gases and air into a catalytic converter combining at least a pair of serially arranged oxidation catalyst beds and through the initial and ultimate catalyst beds until a temperature of the ultimate catalyst bed of about 900° F. is attained; sensing the temperature within the ultimate catalyst bed; diverting the flow of said gaseous mixture when the temperature of the ultimate bed ranges from about 900° F. to about 1600° F., to by-pass the initial catalyst bed and flow through the ultimate catalyst bed; and bypassing the flow of said gaseous mixture through the catalytic converter without passing through any of the catalyst beds when the ultimate catalyst bed temperature exceeds about 1600° F.

2. A catalytic converter for the oxidation of exhaust gases of an internal combustion engine, which comprises a housing, an inlet conduit secured to said housing, an outlet conduit secured to said housing and spaced from said inlet conduit, first and second oxidation catalyst beds serially arranged within said housing, a first conduit leading from said inlet conduit to said first bed, a second conduit leading from said inlet conduit to said second bed and having a portion thereof in communication with said outlet conduit, said second conduit being positioned to receive gases exiting from said first bed, inlet control valve means to regulate the flow of gases from said inlet conduit between said first conduit and said second conduit in accordance with the temperature within said second bed, a third conduit positioned to receive gases exiting from said second bed and having one end communicating with said outlet conduit, outlet control valve means to regulate the discharge of gases from said portion of said second conduit and from said third conduit in accordance with the temperature of said second catalyst bed, and temperature sensing means to actuate said inlet control valve means and said outlet control valve means to cause flow of said gases (A) at start-up, through said first conduit, said first bed, said second conduit, said second bed, and said third conduit to said outlet conduit, (B) under normal operating conditions, through said second conduit, said second bed and said third conduit to said outlet conduit, and (C) at high temperatures where thermal damage to the catalyst beds can occur, through said second conduit to said outlet conduit without passing through either of said beds.

3. A catalytic converter according to claim 2 wherein said inlet control valve means includes a valve member movable between a first end position closing off said first conduit and a second end position closing off said second conduit, said outlet control valve means includes a valve member movable between an end position closing off said portion of said second conduit and an end portion closing off said third conduit, and wherein said first bed is laterally off-set from said second bed, and said second conduit is disposed intermediate said first bed and said second bed.

4. A catalytic converter according to claim 2 wherein said inlet control means includes a valve member movable between a first end position closing off said first conduit and a second end position closing off said second conduit, said outlet control valve means includes a valve member movable between an end position closing off said portion of said second conduit and an end portion closing off said third conduit, and wherein said first bed and said second bed are longitudinally off-set, and partition means between said first bed and said second bed.

References Cited by the Examiner

UNITED STATES PATENTS

| | | | |
|---|---|---|---|
| 3,086,839 | 4/1963 | Bloch | 23—2.2 |
| 3,090,677 | 5/1963 | Scheitlin et al. | 23—288.3 |

OSCAR R. VERTIZ, *Primary Examiner.*

MAURICE A. BRINDISI, *Examiner.*

E. C. THOMAS, *Assistant Examiner.*